United States Patent [19]

Dadourian et al.

[11] Patent Number: 5,940,140
[45] Date of Patent: *Aug. 17, 1999

[54] BACKING LUMINANCE NON-UNIFORMITY COMPENSATION IN REAL-TIME COMPOSITING SYSTEMS

[75] Inventors: Arpag Dadourian, Northridge; Arie Berman, Canoga Park; Paul Vlahos, Tarzana, all of Calif.

[73] Assignee: Ultimatte Corporation, Chatsworth, Calif.

[ * ] Notice: This patent is subject to a terminal disclaimer.

[21] Appl. No.: 08/709,254

[22] Filed: Sep. 10, 1996

[51] Int. Cl.[6] .............................. H04N 9/75; H04N 5/272
[52] U.S. Cl. ............................................. 348/587; 348/586
[58] Field of Search ................................... 348/586, 587, 348/588, 590, 591, 592, 593, 597, 598, 599; H04M 5/272, 5/262, 5/275, 9/75

[56] References Cited

U.S. PATENT DOCUMENTS 5,424,781  6/1995  Vlahos .
5,515,109  5/1996  Vlahos et al. .
5,557,339  9/1996  Dadourian .
5,831,685  11/1998  Vlahos et al. ........................ 348/587

*Primary Examiner*—Michael H. Lee
*Attorney, Agent, or Firm*—Blakely Sokoloff Taylor & Zafman

[57] ABSTRACT

A method of removing the foreground subject and its shadow from a series of image frames including a subject before a colored backing being photographed by a moving camera during a live broadcast. Such removal results in a series of image frames of the colored backing without the subject, each image frame corresponding to an image frame containing the subject. The method steps employed identify, for each frame, those pixels in the frame occupied by elements of the subject. Those pixels are set to an RGB level of zero, to create an image of the colored backing in which the subject area is reduced to black. The image of the colored backing is then smeared to obliterate the defined edges of the subject's shadow and to smear the color of the backing into the black area previously occupied by the subject to generate a clear frame. The clear frame is then utilized to compensate for backing luminance and color nonuniformity, thereby preventing visibility of the joining edge of generated windows that extend the backing to the edge of the frame.

17 Claims, 3 Drawing Sheets

1

BACKING LUMINANCE NON-UNIFORMITY COMPENSATION IN REAL-TIME COMPOSITING SYSTEMS

BACKGROUND OF THE INVENTION

In many newscasts the studio set is not a real set, but is a virtual set rendered in a computer. The newscaster or other foreground subject is inserted by an image compositing process commonly referred to as chroma key or matting. This process requires a colored backing, typically blue (or green), which is replaced in the compositing process by the virtual set. The actual colored backing is of limited size, and on wide-angle shots, or when the camera is panned or tilted too far, the camera field is likely to extend beyond the backing revealing the studio walls, ceiling, lights, etc. It is therefore necessary to extend the backing electronically be generating what are known as windows or garbage mattes, which cover or replace the exposed stage walls. Such generated electronic windows must not show a visible line where they join the actual colored backing.

The backing typically includes a vertical wall and a horizontal floor. The shadow cast by a subject on the backing floor darkens the floor in the area of the shadow. A control signal proportional to the luminance of the colored backing is used to enable the background scene i.e., the virtual set. The reduced luminance in the shadow area reduces the level of the control signal thus retaining the shadow in the composite.

The linearity of the control signal which permits the retention of shadows also causes visibility of the backing-to-window join line when the backing luminance is not perfectly uniform. Backings that are front illuminated with multiple overlapping light sources cannot be illuminated with perfect uniformity. Because the background scene is enabled in its respective areas by a non uniform physical backing, and a uniform electronic window, the residual luminance nonuniformity of the backing causes a visible discontinuity in the background scene where the electronic window joins the physical backing. Current methods for eliminating the visibility of the join line in image compositing systems usually result in a visible loss of edge detail and the loss of shadows.

A method for backing luminance and color non uniformity compensation in image compositing systems (commonly referred to as 'screen correction'), which eliminates the window join line and does not degrade the image, is described in U.S. Pat. No. 5,424,781. A complete description of this method is provided in the referenced patent. In summary, the RGB levels of every pixel on the colored backing is compared to a reference point on the backing and their RGB difference is added to the backing RGB levels to make it perfectly uniform in color and luminance. An inhibit signal is generated to prevent the corrections from being applied to the subject. A product utilizing this screen correction method is the "ultimatte-8" available from Ultimatte Corporation.

A clear frame is required by the above referenced patent for the generation of the inhibit signal. A clear frame is a frame of the colored backing in which all subjects have been cleared from the set. In a non live broadcast environment, screen correction 'clear frames' are generated by repeating the camera moves with a motion control system, with the talent (i.e., foreground subject) removed, and recording the cleared set. In a live broadcast this is not possible.

In order to use the screen correction process in the above referenced patent, it is necessary to generate, in real time (30 or 25 frames/sec.) a synthetic clear frame for each individual image frame. These clear frames, in conjunction with screen correction as described in the above referenced patent, make window edges invisible.

U.S. Pat. No. 5,515,109 describes a method of generating synthetic clear frames by manual identification of subjects and their shadows. This method is not practical for live broadcasts because manual identification of shadow areas cannot occur in real time.

The essence of this invention is to produce a series of synthetic clear frames, in real time, to permit the concurrent use of the screen correction technique of U.S. Pat. No. 5,424,781. The invention described here generates a synthetic clear frame for each image frame and thus permits the referenced screen correction method to function in live broadcasts.

The generation of a clear frame requires identifying those pixels that represent the subject as opposed to those pixels that represent the colored backing so that the subject may be removed. This is done by generating a control signal Ec, and processed video signals (PRV) of the foreground scene which permits identification of these areas.

The "Comprehensive Electronic Compositing System" of U.S. Pat. No. 4,344,085, for example, develops a control signal "Ec", and "Processed Video" (PRV) signal. Control signal Ec is proportional to the luminance and visibility of the backing, and controls the level of the background scene. This Ec matte equation has the form of $$Ec = B - \max(G, R)$$

for a blue backing where B is the blue signal level in an RGB signal and max (G,R) is the higher of the green and red signal levels of the RGB signal.

As shown in FIG. 1, the Ec matte is displayed as black silhouette 2 of the opaque subject against a white field 3. Subsequent patents assigned to Ultimatte Corporation describe expanded forms of the matte equation, and any one of these equations could be substituted for the basic equation above. Any control signal equation that permits identification of the unobstructed backing would function in generating a clear frame by the method described here.

The control signal, derived from the luminance of the backing, is subtracted from the RGB components in the colored backing in amounts sufficient to reduce each component just to zero. This "Processed Video" (PRV) signal displays the subject in full color against a black field. These two signals, Ec and PRV, are used to define and identify the subject area, the colored backing area, and the subject-to-backing transition area which is semitransparent. These areas are identified when the following relationships exist:

in the unobscured backing area, Ec>0, and PRV=0 in a semitransparent area, Ec>0, and PRV>0 in the opaque subject area, Ec=0, and PRV≧

These definitions are more fully explained in co-pending application Ser. No. 08/240,881, filed May 9, 1994, now U.S. Pat. No. 5,557,339.

SUMMARY OF THE INVENTION

A method is disclosed for removing a foreground subject and its shadow from a series of image frames including a subject before a colored backing being photographed by a moving camera during a live broadcast. Such removal results in a series of image frames of the colored backing without the subject, each image frame corresponding to an image frame containing the subject. The method steps employed identify, for each frame, those pixels in the frame occupied by elements of the subject. Those pixels are set to an RGB level of zero, to create an image of the colored backing in which the subject area is reduced to black. The image of the colored backing is then smeared to obliterate the defined edges of the subject's shadow and to smear the color of the backing into the black area previously occupied by the subject to generate a clear frame. The clear frame is then utilized to compensate for backing luminance and color nonuniformity, thereby preventing visibility of the joining edge of generated windows that extend the backing to the edge of the frame.

DETAILED DESCRIPTION OF THE INVENTION

Figure 1:
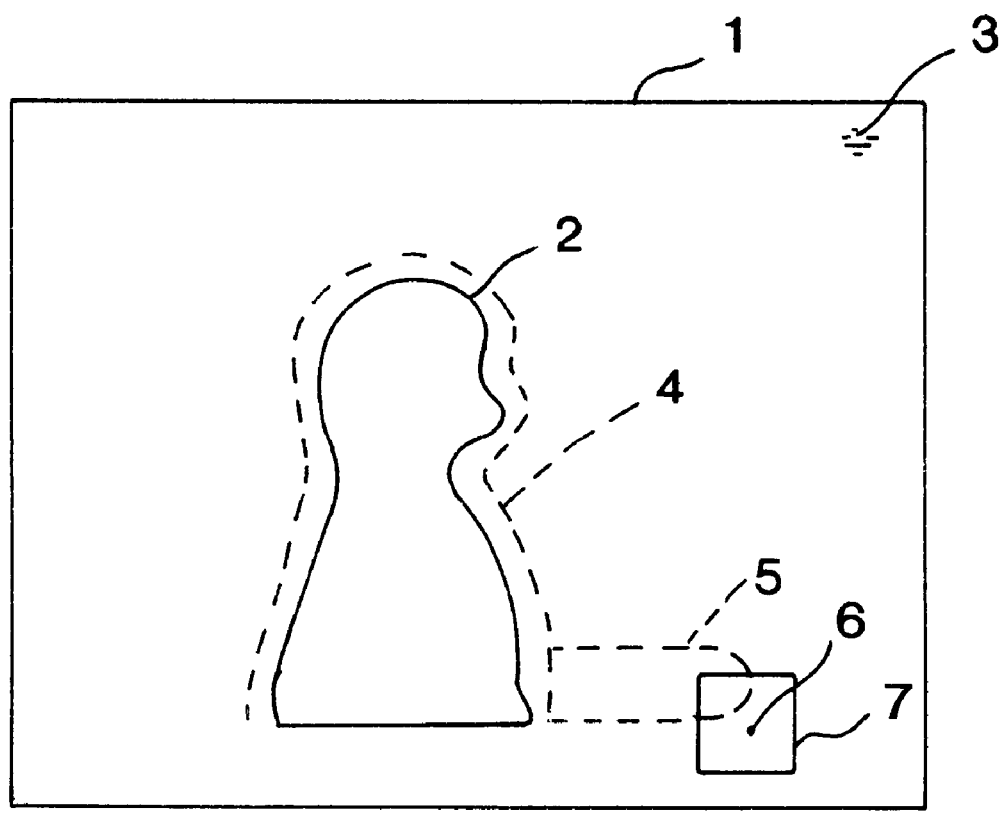
FIG. 1 is a visual display of control signal Ec forming a black silhouette matte of a foreground subject against a white field and the subject's shadow.

In FIG. 1, the display 1 of control signal Ec is that of a black silhouette matte 2 of a foreground subject against a white field 3. The subject's shadow is shown as an area within dashed line 5 against the white field. The edge of a moving (or out of focus) object is slightly blurred and semitransparent, and is displayed as the area between silhouette matte 2 and dashed line edge 4. This area within dashed line edge 4 represents the transition between the subject and the colored backing, and contains elements of both. It is necessary to remove the subject, its shadow, and those subject elements in the transition area, from each image frame to synthesize a series of clear frames.

Those pixels in the opaque subject area and transition area, may be identified as noted above. These two areas, containing all of the elements of the subject, will be assigned a value of zero. What remains in the image frame is the colored backing field 3 of the backing with a black hole in place of the subject 2. When this image is smeared, the well defined edge of shadow 5 is obliterated and the shadow is lightened. The colored backing 3 is smeared into the black area 2 and 4 representing the subject and the subject's edge transition to the backing.

Smearing is accomplished by averaging the RGB levels of a local pixel group 7 surrounding each pixel 6 in the frame. Pixels having a value of zero represent the subject and are deleted from the averaging process. The size of the pixel group 7 is selected as a function of the shadow size and the relative uniformity of the backing. Pixel group 7 will be automatically adjusted larger or smaller as a function of a zoom signal that alters the lens angle and the size of the backing in relation to the raster.

On a typical illuminated backing, there are no sharp changes in luminance or color. Generally, there is a smooth fall off toward the corners, with a smooth transition from lighter to darker areas. The smooth transitions of backing luminance remain essentially unchanged when the image is smeared. The result of eliminating shadow definition, and of filling in the black area representing the subject, is a synthetic clear frame of sufficient quality to be used for screen correction. The method described above for generating clear frames is adequate for installations that use a practical (real, non blue) floor.

A studio that extends the colored backing onto the floor introduces a number of problems whose solution requires additional functions. The processed video signal PRV defined above does not always result in an exact zero in the floor area. Minor differences in the color of individual lighting units, dirt or dust on the colored floor backing, scuffmarks, footprints, and the differing reflection angles of the floor, coving, and back wall all contribute to a small luminance and color residual.

One such additional function is to provide a negative offset to the processed video signal to reduce to black many of the artifacts on the floor. The offset, however, reduces the level of the subject's boundary pixels which makes it appear as a shrinkage of the subject. The zero level subject area, which includes the transition area, must therefore be expanded at its perimeter, by a few pixels.

A second function is to fully fill the area of the subject and its edge transition with the color (typically blue) of the backing. In the event of rapid cross screen action near the camera, the semitransparent transition area may be so wide that the image smear will not cover it, leaving elements of the subject remaining in the clear frame.

In some cases, the cove between the floor and wall does not completely vanish. This cove residual is not likely to be seen except at the sharp line of demarcation where the cove touches the edge of the electronic window. To prevent any visibility of the window edge at this junction of window and cove, the smearing function is tapered to zero as the window edge is approached. This shading function (electronically equivalent to the soft edge window performed by the Ultimatte-8 available from Ultimatte Corporation) would be employed even if the cove was entirely invisible, in order to prevent a subject's shadow from being cut off abruptly should it touch the window's edge. These additional functions are described as follows with the aid of FIG. 2.

Figure 2:
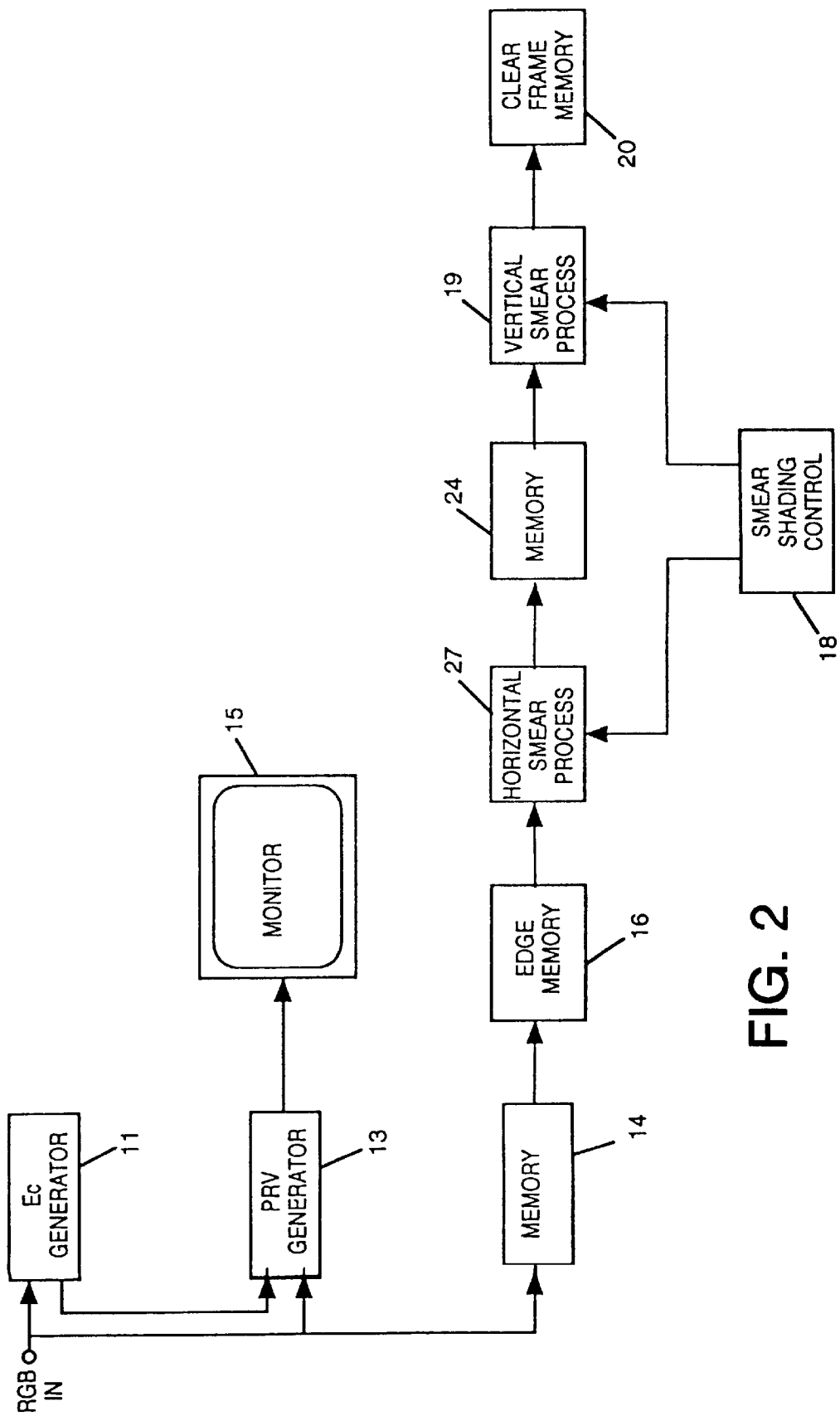
FIG. 2 is a block diagram showing one embodiment of the invention for producing clear frames implemented in hardware.

FIG. 2 shows the incoming RGB signals connected to Ec generator 11, to PRV generator 13, and to memory 14. As scanning begins, Ec is generated and delivered to PRV generator 13. The display of PRV generator 13 shows the subject in full color against a black field. A negative offset is applied to PRV generator 13 to remove many of the floor artifacts. Adjustment of the offset may be observed on monitor 15. Although not shown in FIG. 2, all of the functions are typically connected to the monitor. Since Ec and PRV both exist in PRV generator 13, the backing, transition, and opaque subject areas are identified at this time. A suitable Ec generator 11 and PRV generator 13 which may be used in the present invention are described in U.S. Pat. No. 5,557,339. Memory 14 and the various other memories described herein is any suitable storage medium for video information such as random access memory (RAM) or magnetic media.

Pixels identified as an opaque subject are assigned a zero value in memory 14. The RGB of the transition area and the unobscured backing area, having been identified, are loaded into memory 14 without change. The content of memory 14 is simultaneously loaded into edge memory 16, leaving memory 14 ready to receive the next image frame. Since a semitransparent area may be a transition area or a dirty footprint, memory 16 is used to make this distinction.

As the scan from the left of the image in memory 16 enters the first pixel of an area identified as a semitransparent area, it is ignored unless the preceding pixel has a value of zero. This preceding pixel is zero only when the scan is leaving an opaque subject area. Therefore, an identified transition area on the far side of a subject is assigned values of zero. A zero is also assigned to the next pixel or two to add back any loss of subject edge due to the negative offset. This scan line includes the colored backing RGB levels and levels of zero for the subject and for the transition on the right side of the subject, and is stored in memory 24. The scan is repeated from the right on the same scan line in order to detect and verify that a transition area exists on the left of the subject, which is also stored in a memory 24. Similarly, a top to bottom scan, and a bottom to top scan are required to identify valid edge transitions and to expand the subject area. After these four scans are complete, memory 16 is ready to receive the next image frame.

The next function to be performed is the smearing of the image in memory 16 to eliminate the well defined edge of the subject's shadow, and to smear blue (or other color of the backing) into the subject area as described above using an average of the pixels in a local pixel group 7. That average is obtained using horizontal smear process 17 by horizontally scanning the image in memory 16 and storing a running average of a selected number of pixels (e.g. 50) in memory 24. As each of the 50 pixels enters the black (zero) area, it is deleted from the averaging process. When all 50 pixels are in the black area, there are no pixels left to average, therefore the RGB values of the last blue pixel is repeated until one of the 50 pixels reenters the blue backing area on the other side of the subject. Repeating the last available average completely fills in the subject area including its edge transition. Similarly, memory 24 is smeared vertically by vertical smear process 19 and the averages stored in memory 20.

Both scans above are subject to control by smear shading control 18. As the pixel group leaves or approaches a window edge, in memory 16 and memory 24, the weighting factor of the pixel group is adjusted so that the pixel adjacent to the window edge is not smeared, but retains its original RGB levels. This smear shading control 18 is essentially identical to the control that generates the soft edge window in the Ultimatte-8. This step assures that the window edge remains invisible. Tapering the smearing as the window edge is approached assures that a shadow is not cut off abruptly, and that a coving will not be visible at the window edge.

The resulting fully smeared image in clear frame memory 20 shows the colored backing with the subject and his shadow. This synthetic clear frame closely approximates a true clear frame and permits compositing equipment such as the Ultimatte-8 to fully correct and eliminate variations in backing luminance and color thus maintaining a non visible join line between the window and backing, while retaining subject edge detail and shadows.

For NTSC (30 fps) video, a normal digitizing clock rate is on the order of 13.5 mHz. By increasing the clock rate 4 times to 54 mHz, edge memory 16 requiring four scans can be performed in the time span of one normal frame (1/30 sec.). By using a clock rate of 27 mHz, memory 16 and memory 24 can both be scanned in 1/30 second. By adjusting the clock rate, generating a clear frame can be delayed from about three to seven image frames, which makes it time compatible with several makes of image processing equipment.

Figure 3:
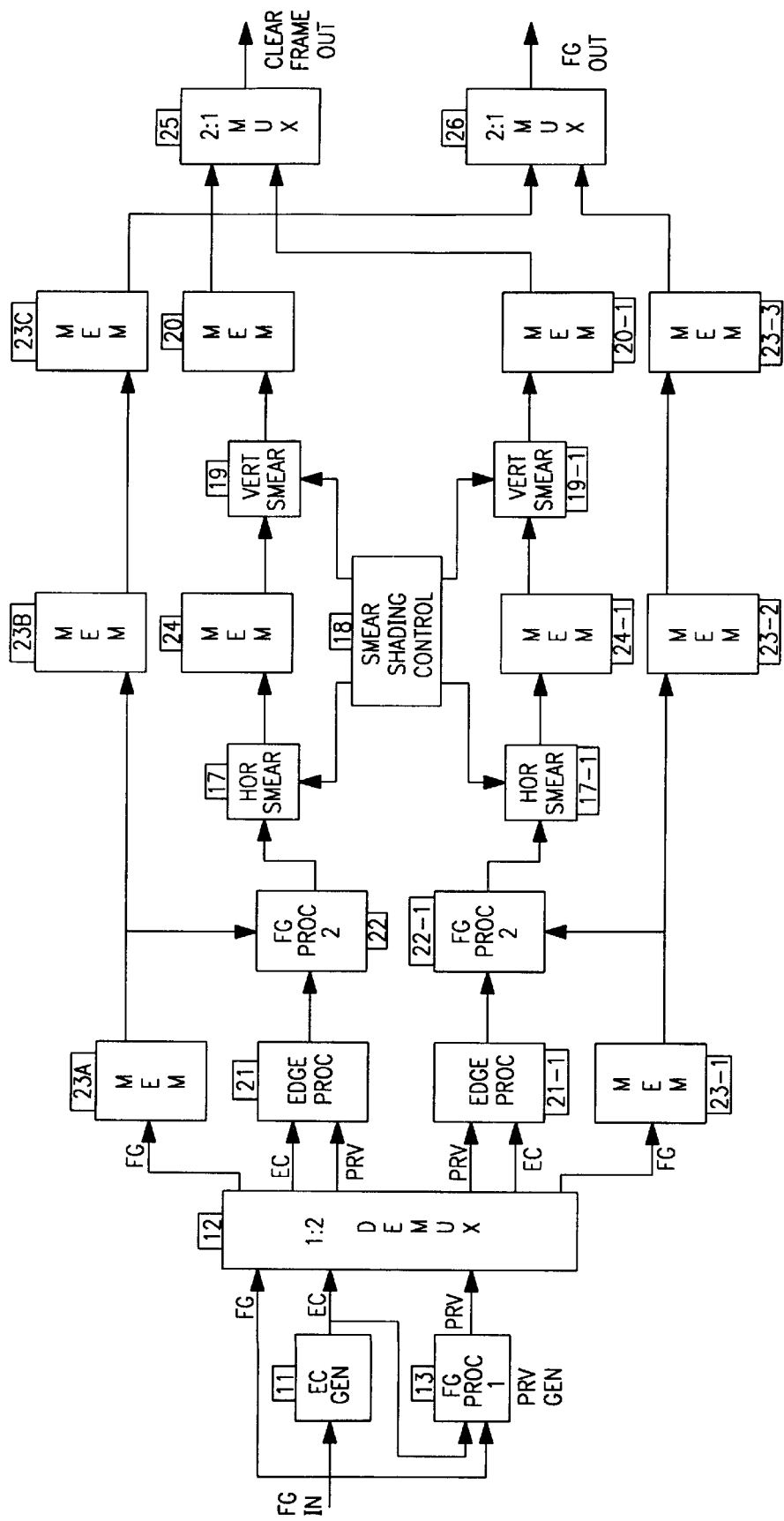
FIG. 3 is a block diagram for implementing an alternate embodiment of the invention that shortens the processing time to produce clear frames.

FIG. 3 illustrates a practical alternate design of hardware that shortens the process time to produce clear frames. One can multiplex parts of the process through two or more multiple identical paths as described below. The RGB signal input of the foreground scene is connected to demultiplexer 12, to Ec generator 11, and to PRV generator 13. Ec is connected to demultiplexer 12 and to PRV generator 13, which is also connected to demultiplexer 12. Demultiplexer 12 routes alternate frames (e.g. odd) of the foreground scene to memory 23*a*, and Ec generator 11 and PRV generator 13 to edge processor 21. Even frames are routed to the lower half of FIG. 3, which is an exact duplicate of the upper half of FIG. 3.

The foreground scene is routed through memories 23*a*, 23*b*, 23*c* and to multiplexer 26 for one frame, and through memories 23-1, 23-2, 23-3 and to multiplexer 26 for a second frame. By this process, the foreground scene is delayed three frames and will be in time with the clear frame as it leaves multiplexer 25. Edge processor 21 provides an offset to the processed video to submerge all artifacts such as dust, dirt, footprints, etc. below zero so as to leave the backing area black. In this connection, edge processor 21 is hardware or software which calculates an offset as needed to submerge the artifacts below zero, the specifics of which are well known in the art. The offset also decreases subject edge luminance thus losing a little of the edge. Processor 21 also identifies the subject, transition, and backing area pixels, and routes this information to foreground (FG) processor 22 (which is simply a PRV generator as described above). Foreground processor 22 assigns a zero to the subject area and to the transition area (which contains elements of the subject), and enables the transfer of the FG video colored backing area into processor 22. The output of processor 22, i.e., the colored backing with a black hole in place of the subject, is routed to the horizontal smear process 17 which smears the video signal horizontally. The smeared image, under control of shading generator 18 is stored in memory 24. Vertical smear process 19, under control of smear shading control 18 smears the image in memory 24 vertically, and stores it in memory 20. As an option, the smeared clear frame in memory 20 can be horizontally and vertically smeared again in the same manner. This creates a more "isotropic" effect, removing traces of vertical and/or horizontal trends that can still be slightly visible after the first smearing. A second smearing of the smeared image is similar to a "weighted" average. It is a simple way of simulating a weighted average without doing all the multiplications.

Expanding the subject a few pixels after it appears to shrink as a result of the negative offset, does not recover thin or individual strands of hair that should be seen in a close-up, especially as they stray away from the subject, unless one expands the subject's silhouette by a large number of pixels. Another option, which can reduce the need for offsetting and expanding the subject, is to zero any pixel (which makes it part of the subject) at which a sufficient discontinuity is detected (i.e. a high derivative—a large difference in value from a nearby pixel).

Any sufficiently abrupt discontinuity is not part of the slow varying imperfections in the colored backing, due to lighting, cove, paint, etc., which is desired to be removed. On the other hand, such abrupt discontinuities are typical of hair which is often so thin that it is similar to the backing color. By removing (zeroing) the core of such strands, it is only necessary to expand the subject by a relatively small number of pixels to guarantee that virtually all subject pixels are included.

The functions described above include image scanning, digitizing, memory, voltage offset, monitoring with a CRT display, expanding, and scanning an image in memory.

These are standard building blocks for digital video equipment. The description of the invention which may be implemented using these standard building blocks is fully sufficient, for those who design digital video equipment, to construct a device that generates a series of synthetic clear frames in real time.

We claim:

1. A method of removing the foreground subject and its shadow from a series of image frames including a subject disposed before a colored backing, being photographed by a moving camera during the live broadcast of said subject, to result in a series of image frames of the colored backing without subject, each corresponding to an image frame containing the subject which is scanned at a predetermined clock rate, said method comprising the steps of:

a) identifying, for each frame, those pixels in the frame occupied by elements of the subject, b) setting said subject pixels to an RGB level of zero, to create an image of the colored backing in which the subject area is reduced to black, c) smearing said image of the colored backing to obliterate the defined edges of the subject's shadow and to smear the color of the backing into the black area previously occupied by the subject to generate a clear frame, d) utilizing said clear frame to compensate for backing luminance and color nonuniformity, thereby preventing visibility of the joining edge of generated windows that extend the backing to the edge of the frame.

2. The method of claim 1 in which those pixels located in the subject area, semitransparent areas, and unobscured backing area, are defined when control signal Ec and processed video PRV have the following relationships:

in the unobscured backing area, Ec>0, and PRV=0 in semitransparent areas, Ec>0, and PRV>0 in the opaque subject area, Ec=0, and PRV≧0 where Ec is a control signal proportional to the luminance and visibility of the backing, and PRV is the foreground scene in which Ec is subtracted from the backing RGB levels to reduce the colored backing to black.

3. The method of claim 1 in which those pixels in the frame occupied by elements of the subject, include both the opaque subject area and the subject's semitransparent edge transition area.

4. The method of claim 2 in which the area identified as a subject edge transition area, when Ec>0 and PRV>0, is accepted as a valid transition only when the transition area adjoins an opaque subject area identified by the relationship Ec=0 and PRV≧0.

5. The method of claim 1 in which the image is smeared by replacing the RGB levels at each pixel in the image frame by an average of a local group of pixels surrounding said pixel, and where said group of pixels to be averaged excludes any pixel whose RGB levels are zero.

6. The method of claim 5 in which all pixels in the group of pixels to be averaged have zero level, then the average RGB levels of a previous pixel group containing at least one pixel whose RGB levels were not zero is assigned as the pixel average.

7. The method of claim 5 in which the size of the pixel group to be averaged is automatically increased or decreased in response to a signal that also controls a focal length of a zoom lens of the camera.

8. The method of claim 5 in which the smearing of the image, by averaging a local group of pixels, is progressively reduced to zero smear at a window edge, thereby preventing a sharp cutoff of a shadow that inadvertently touches a window edge.

9. The method of claim 2 in which the processed video, PRV, is negatively offset to eliminate artifacts on the backing from being mistakenly identified as the transition edge of a subject.

10. The method of claim 9 in which the subject edge is expanded to compensate for image shrinkage induced by a negative offset to PRV.

11. The method of claim 1 wherein said image frame is scanned multiple times, and such multiple scans are made at a higher clock rate than said predetermined clock rate to reduce the number of frames to be delayed in creating a clear frame.

12. The method of claim 4 wherein said image frame is scanned multiple times, and such multiple scans are made at a higher clock rate than said predetermined clock rate to reduce the number of frames to be delayed in creating a clear frame.

13. The method of claim 5 in which the average of said local pixel group is accomplished by first averaging a group of pixels on each scan line when the image is scanned horizontally, and by averaging a group of pixels on each scan line when the image is scanned vertically.

14. The method of claim 1 in which said smeared image is smeared a second time to remove any visual linear traces of the image smear.

15. The method of claim 1 in which elements of the subject include semitransparent strands of hair and detection of said strands is made by detecting a selected level of discontinuity in value from adjacent pixels.

16. The method of claim 1 in which the identifying, setting and smearing steps are performed at a higher clock rates than said predetermined clock rate so as to minimize the processing delay in generating a clear frame.

17. The method of claim 1 in which the processing time to generate a clear frame is reduced by multiplexing predetermined steps of the process through multiple substantially identical paths.

* * * * *